United States Patent
Cullen

(10) Patent No.: US 6,226,585 B1
(45) Date of Patent: May 1, 2001

(54) TORQUE ESTIMATION METHOD FOR AN INTERNAL COMBUSTION ENGINE

(75) Inventor: Michael John Cullen, Northville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/551,873

(22) Filed: Apr. 18, 2000

(51) Int. Cl.[7] .................................................. F16H 59/14
(52) U.S. Cl. .............................. 701/54; 477/110; 477/115
(58) Field of Search .................................. 701/54, 53, 57, 701/55, 58, 59, 51; 477/110, 115, 129, 107, 109

(56) References Cited

U.S. PATENT DOCUMENTS

| | | | |
|---|---|---|---|
| 4,139,892 | 2/1979 | Gudea et al. | 705/407 |
| 4,492,195 | 1/1985 | Takahashi et al. | 123/339.11 |
| 4,721,083 | 1/1988 | Hosaka | 430/106 |
| 4,811,222 | * 3/1989 | Watanave et al. | 701/68 |
| 4,976,589 | 12/1990 | Ide | 426/119 |
| 5,020,491 | * 6/1991 | Mashino | 123/192.1 |
| 5,163,399 | 11/1992 | Bolander et al. | 123/399.17 |
| 5,241,855 | 9/1993 | Cullen et al. | 73/117.3 |
| 5,245,966 | 9/1993 | Zhang et al. | 123/339.19 |
| 5,319,555 | 6/1994 | Iwaki et al. | 701/57 |
| 5,483,820 | 1/1996 | Nakamoto et al. | 73/1.09 |
| 5,692,988 | 12/1997 | Beim et al. | 475/281 |
| 5,752,387 | 5/1998 | Inagaki et al. | 62/133 |
| 5,826,208 | 10/1998 | Kuroiwa et al. | 701/54 |
| 5,910,176 | 6/1999 | Cfreger | 701/59 |
| 5,924,296 | 7/1999 | Takano et al. | 62/133 |
| 5,938,712 | 8/1999 | Ibamoto et al. | 701/54 |
| 6,155,230 | * 12/2000 | Iwano et al. | 123/339.16 |
| 6,173,226 | * 1/2001 | Yoshida et al. | 701/51 |

OTHER PUBLICATIONS

SAE Paper #660368, "Torque Converter as a Vibrator Damper and Its Transient Characteristics", T. Ishihara, R.I. Emori, Mid–Year Meeting, Detroit, MI, Jun. 6–10, 1996, pp. 1–13.

SAE Paper #820393, "Dynamic Models for Torque Converter Equipped Vehicles", A.J. Kotwicki, Electronic Engine Management and Driveline Controls P–104, pp. 103–117.

ISATA Paper #84041, Proceedings, vol. 1, "The Inertia collection System Utilization In Modern Engine Research And Supervision", Lars Th. Collin, Chalmers University of Technology, Sweden, pp. 669–689.

* cited by examiner

Primary Examiner—William A. Cuchlinski, Jr.
Assistant Examiner—Marthe Marc-Coleman
(74) Attorney, Agent, or Firm—John D. Russell; Julia Voutyras

(57) ABSTRACT

A method is presented for correcting estimates of engine output torque and accessory load torque. Engine output torque estimates are corrected when the accessory is disengaged from the engine. Accessory load torque is learned, or corrected, when the accessory is engaged to the engine. In one example, these corrections are made when engine output torque is known to be substantially zero from torque converter speed ratio or from the timing of the overrunning clutch engagement. This information is then used to control engine output torque to improve drive feel and vehicle performance.

20 Claims, 5 Drawing Sheets

TORQUE ESTIMATION METHOD FOR AN INTERNAL COMBUSTION ENGINE

FIELD OF THE INVENTION

The field of invention relates to a control of a vehicle equipped with an automatic or manual transmission, and in particular to an engine torque control based on estimates of accessory loading.

BACKGROUND OF THE INVENTION

Vehicles have an engine and various accessories such as an air conditioning (A/C) compressor, power steering pump, or alternator intermittently coupled to the engine. The A/C compressor is coupled to the engine via the A/C compressor clutch. When the A/C compressor is engaged, it consumes a certain amount of engine combustion torque. When this happens, a vehicle driver can feel the impact of A/C compressor engaging, and thus drive feel is degraded. Better engine control and improved drive feel are achieved by estimating A/C compressor load torque and adjusting engine torque accordingly. In other words, by increasing engine torque in response to increased accessory load torque, degradation in vehicle performance is avoided, and driver comfort during A/C compressor engagement is improved.

One control method of this kind is described in U.S. Pat. No. 5,826,200. engine output torque is calculated by using engine characteristics, and torque converter torque is calculated using torque converter characteristic. In the low-speed, light-load vehicle operation region the impact of the load torque of accessory devices is relatively large compared with the output torque of the engine. Therefore, when the speed ratio is relatively small, accessory load torque can be calculated as the difference between the output torque of the engine and the torque converter torque.

The inventors herein have recognized a disadvantage with this approach. In particular, when the torque converter torque is interpolated from the characteristic map of the torque converter ratio as related to the speed ratio, variations in the torque converter fluid characteristics can cause reduced accuracy. In other words, estimating torque using torque converter characteristics is susceptible to variations in hydraulic fluid properties. For example, when the fluid is cold, it is more viscous, and torque prediction will not be as accurate. Thus, accessory torque estimates are affected by the variation in hydraulic fluid properties.

Another disadvantage is that this method does not account for the torque due to losses from friction work, pumping work, accessory load other than A/C, etc. The above approach does not distinguish between the above "loss" torques and A/C load torque. Variations in this "loss" torque can cause further inaccuracies in estimated accessory load torque. Additionally, the above method cannot be used when the torque converter is locked, which is a large proportion of the vehicle drive cycle.

SUMMARY OF THE INVENTION

An object of the present invention is to provide a method for calculating load torque of an accessory device coupled to an engine.

The above object is achieved and disadvantages of prior approaches overcome by an accessory load torque estimation method for use with an internal combustion engine having a torque converter and an accessory, the engine and the accessory coupled to a vehicle. The method comprises learning engine torque based on an engine operating condition when torque converter torque is less than a predetermined value and the accessory is disengaged; and estimating a load torque of the accessory based on said operating condition and said residual engine torque when said torque converter torque is less than said predetermined value and the accessory is engaged.

An advantage of the above aspect of the invention is that a more precise method of engine torque control is achieved. Another advantage is that improved drive feel is achieved during accessory engagements.

Other objects, features and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings wherein:

DESCRIPTION OF THE INVENTION

Figure 1:
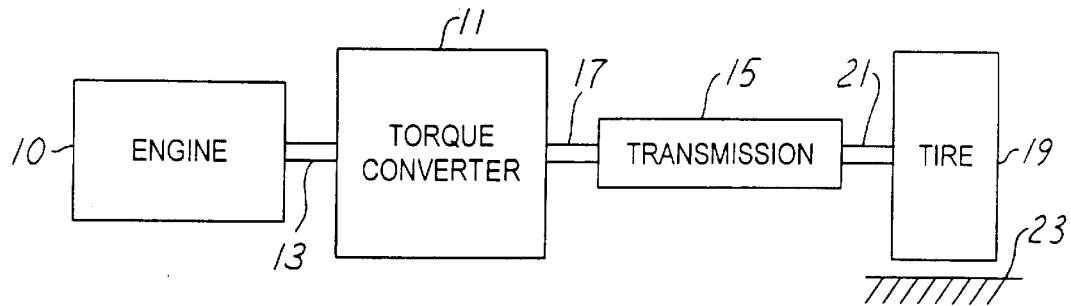
FIG. 1 is a block diagram of a vehicle illustrating various components related to the present invention.
Figure 2:
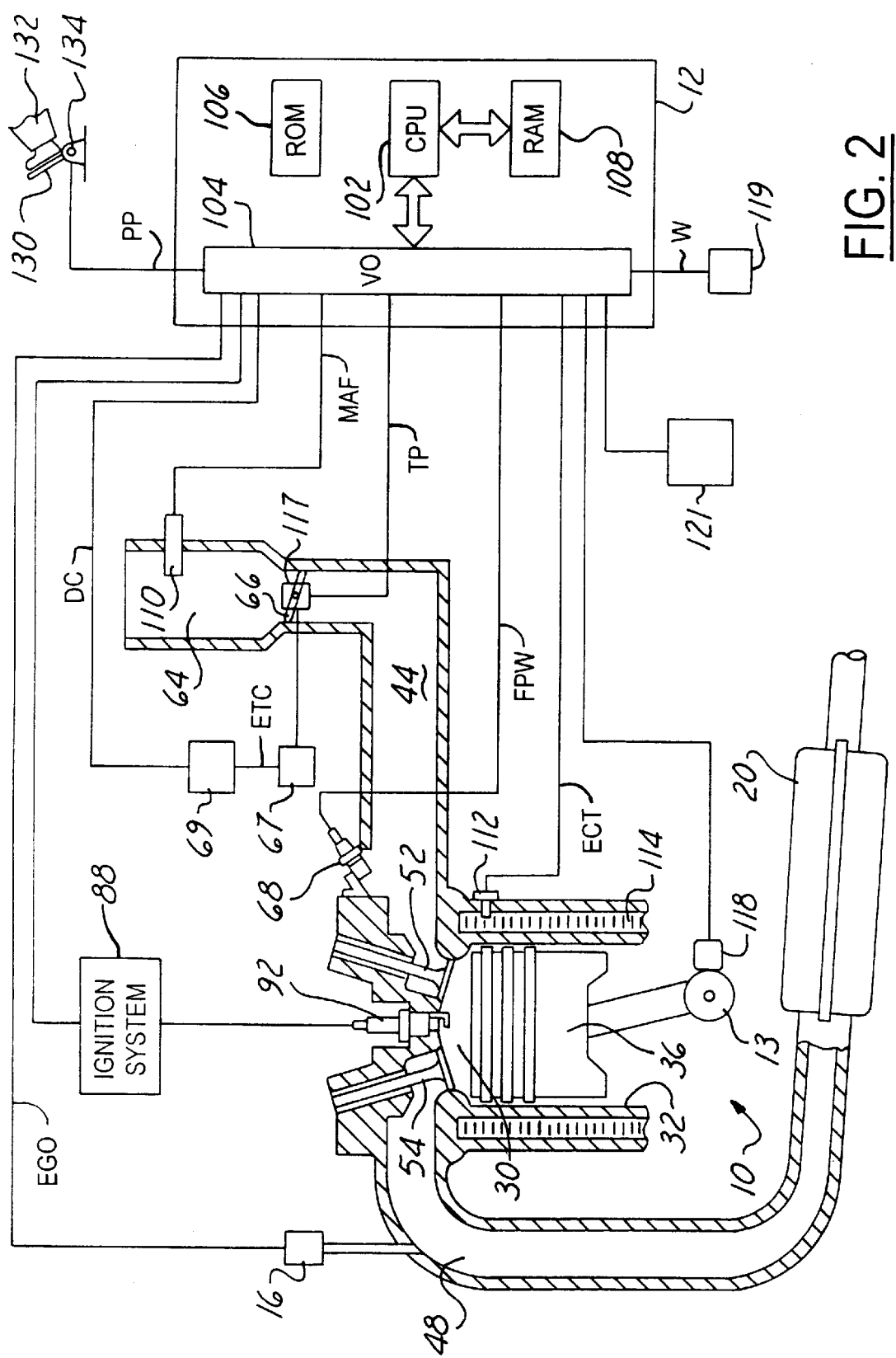
FIG. 2 is a block diagram of an engine in which the invention is used to advantage.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17 which is also known as a transmission input shaft. Torque converter 11 has a bypass clutch (not shown) which can be engaged, disengaged, or partially engaged. When bypass clutch is either disengaged or partially engaged, torque converter 11 is said to be in an unlocked state. Transmission 15 is an electronically controlled transmission with a plurality of selectable discrete gear ratios. Transmission 15 also includes various other gears such as, for example, a final drive ratio (not shown). Transmission 15 is also coupled to tire 19 via axle 21. Tire 19 interfaces the vehicle (not shown) to the road 23. In an alternative embodiment, transmission 15 can be a manually operated transmission and torque converter 11 can be eliminated.

Internal combustion engine 10 having a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (We). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3:
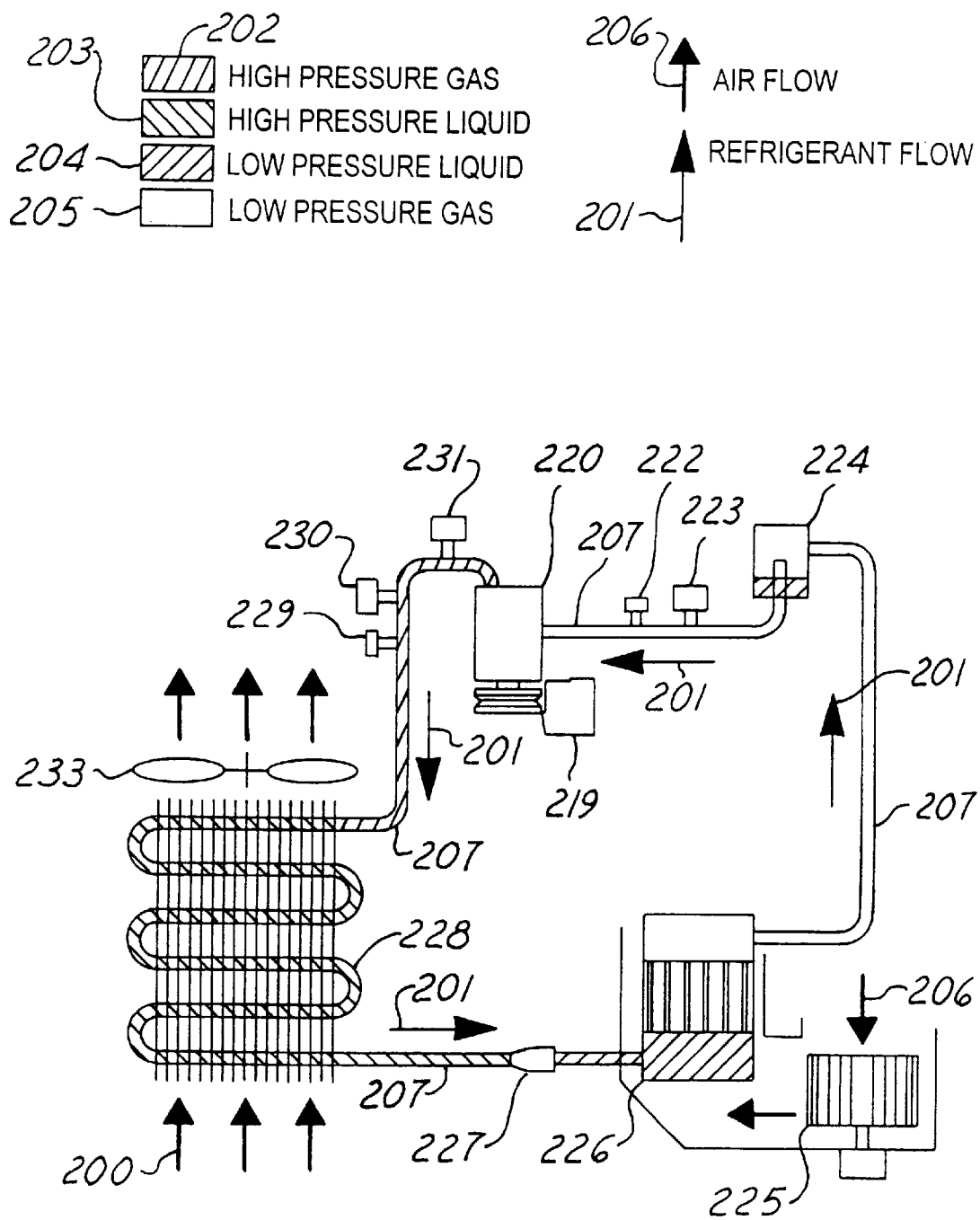
FIG. 3 is a block diagram of an air conditioning system illustrating various components related to this invention.

Referring now to FIG. 3, an air conditioning (A/C) system is shown. Arrows 201 indicate direction of refrigerant, or working fluid, flow. Arrows 200 indicate direction of air flow that is circulated through the engine compartment (not shown). Arrows 206 indicate direction of air flow that is circulated through the cabin (not shown). Solid shading 202 indicates working fluid is a high pressure gas, left handed cross-hatching 203 indicates working fluid is a high pressure liquid, right handed cross-hatching 204 indicates working fluid is a low pressure liquid, and no shading 205 indicates working fluid is a low pressure gas. Working fluid is circulated through the A/C system via line 207.

Compressor 220, which is shown coupled to engine 10 via clutch 219, is located between high pressure gas 202 and low pressure gas 205. Upstream of compressor 220, is low pressure service port 222 and A/C cycling switch 223. Suction Accumulator/drier 224 is upstream of cycling switch 223. Further up is A/C evaporator core 226, which is coupled to blower motor 225. Next are A/C evaporator orifice 227 and A/C condenser core 228, which is coupled to radiator fan 233. High pressure service port 229, compressor relief valve 230, and A/C pressure cut-off switch 231 are upstream of A/C condenser core 228.

A description of an A/C thermodynamic process is now presented. Starting at compressor 220, low pressure gas 205 is compressed to high pressure gas 202, rising in temperature due to compression. Compressor relief valve 230 prevents high pressure gas 202 from reaching a maximum allowable high pressure gas pressure. A/C pressure cut-off switch 231 disengages compressor 200 from engine 10 via clutch 219.

High pressure gas 202 sheds heat to the atmosphere at A/C condenser core 228, changing phase to high pressure liquid 203 as it cools. At A/C evaporator orifice 227, high pressure liquid 203 expands to low pressure liquid 204. At A/C evaporator core 226 low pressure liquid 203 passes through a jet (not shown) and evaporates into low pressure gas 205. This action cools the working fluid, A/C evaporator core 226, and cabin airflow 206.

Low pressure liquid 204 continues to suction accumulator/drier 224 and A/C cycling switch 223. A/C cycling switch 223 signals to engage compressor 220 to engine 10 via clutch 219 when measured pressure is above a predetermined maximum pressure. A/C cycling switch 223 also signals to disengage compressor 220 from engine 10 via clutch 219 when measured pressure is below a predetermined minimum pressure. These setpoint pressures are typically 45 psi and 24.5 psi, respectively. They are designed to keep A/C evaporator core 226 just above freezing. When compressor 220 cycles between engaged and disengaged due solely to A/C cycling switch 223, it is referred to herein as normal, or uninterrupted, cycling.

Figure 4:
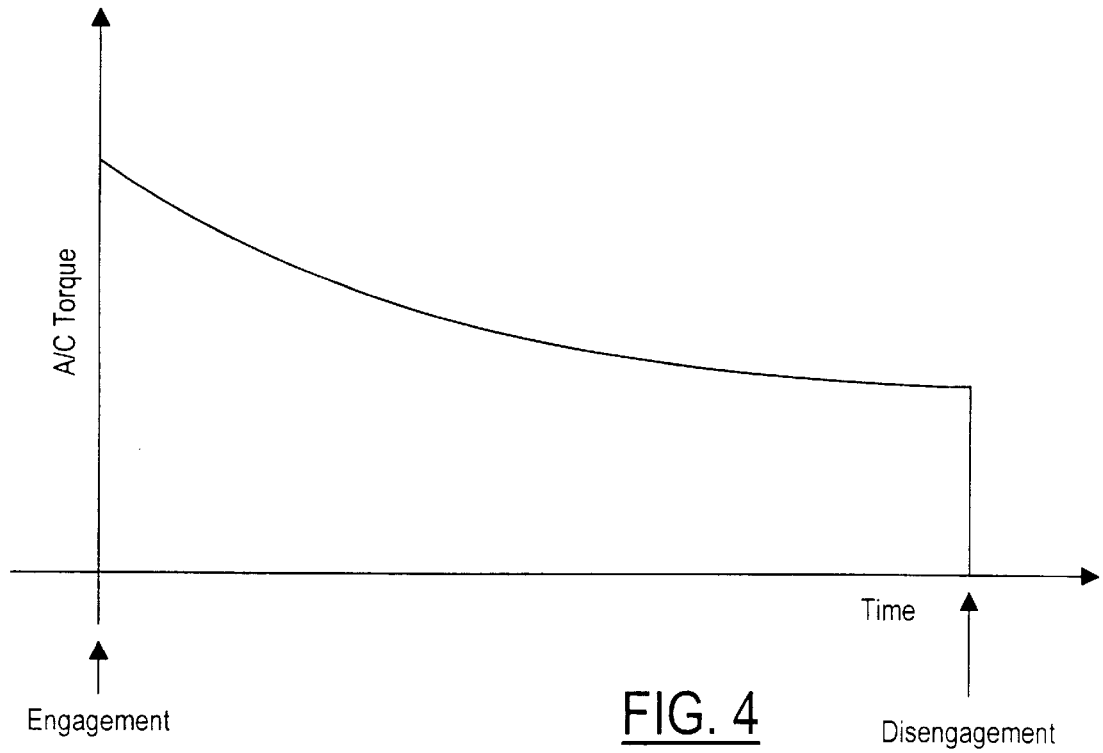
FIG. 4 is a graph of A/C torque level vs. Time.

Referring now to FIG. 4, a typical graph of A/C torque level vs. Time is shown. This is the assumed shape used in part to estimate A/C load as described later herein. In other words, the routines described herein in part learn an offset value that is used to adjust the curve of FIG. 4.

Figure 5:
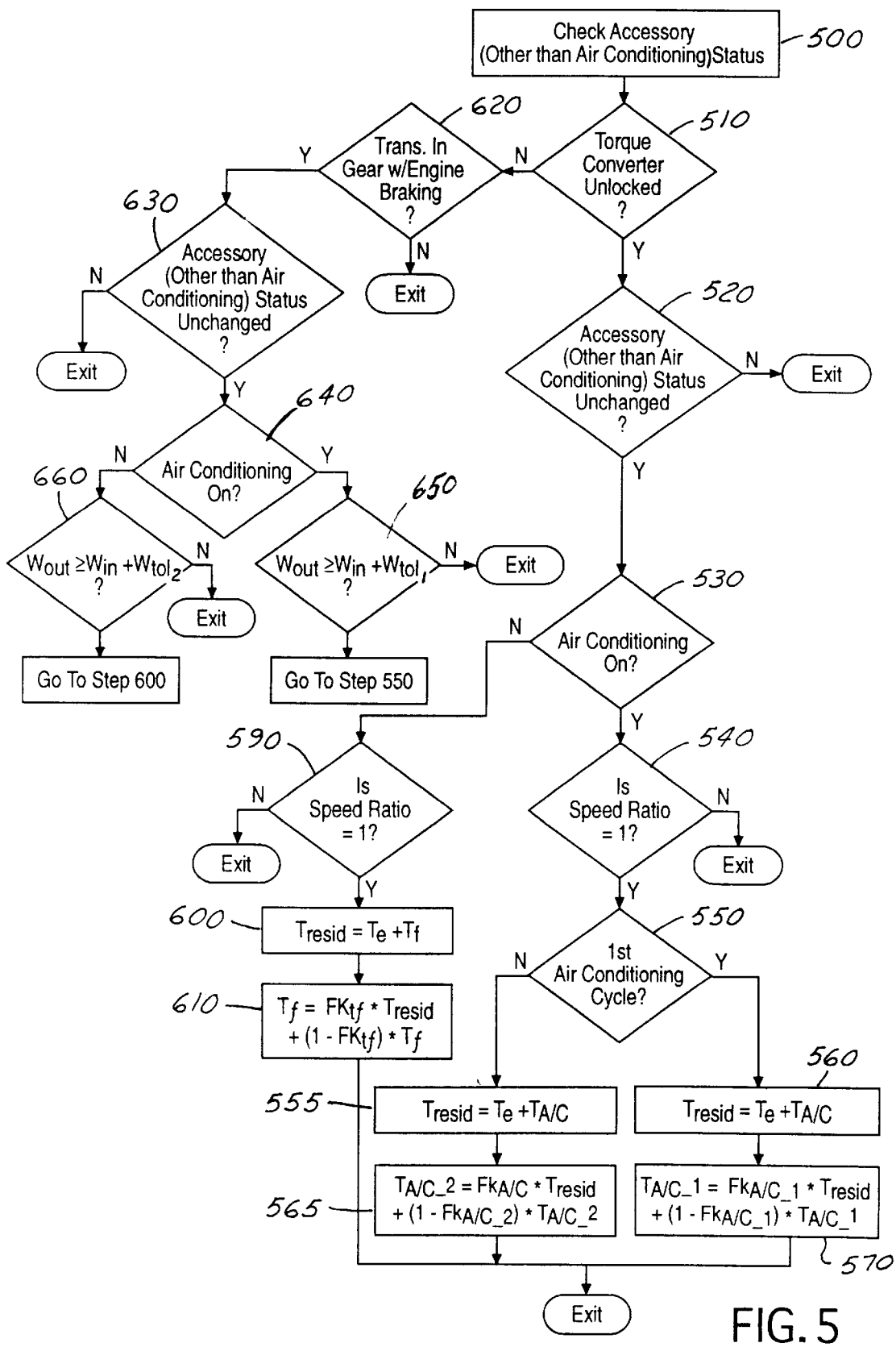

Referring now to FIG. 5, a routine is described for determining residual engine torque and A/C load torque instantaneous error according to the present invention. First, in step 500 accessory(other than A/C) engagement status flag is read and stored. Next, in step 510, a determination is made whether the torque converter clutch is unlocked. If the answer in step 510 is NO, the routine proceeds to step 620 whereupon a decision is made whether the transmission is in the gear with engine breaking. Typically, transmissions are built with engine breaking prevented in lower gears. The flowchart in FIG. 5 provides for engine breaking prevention in any transmission gear If the answer to step 620 is NO, the routine is exited. If the answer to step 620 is YES, the routine proceeds to step 630 whereupon a determination is made whether the accessory (other than A/C) status remains unchanged. If the answer to step 630 is NO, the routine is exited. If the answer to step 630 is YES, the routine proceeds to step 640 whereupon a determination is made whether the A/C is ON. If the answer to step 640 is YES, the routine proceeds to step 650, and a determination is made whether wheel speed has just become greater than engine speed by a small preselected tolerance amount. Alternatively, a determination can be made whether engine speed has just become greater than the wheel speed times the gear ratio of the transmission, or, if it was greater, has just become less. In other words, if the clutch was over-running and then stopped over-running, a transition through zero torque has again occurred. If the answer to step 650 is NO, the routine is exited. If the answer to step 650 is YES, the routine proceeds to step 550 as described further down. If the answer to step 640 is NO, the routine proceeds to step 660 whereupon a determination is made whether wheel speed is greater than engine speed by a small preselected tolerance amount. If the answer to step 660 is NO, the routine exits. If the answer to step 660 is YES, the routine proceeds to step 600 as described bellow. If the answer to step 510 is YES, a determination is made in step 520 whether accessory (other than A/C) engagement status remains unchanged. If the answer in step 520 is NO, the routine is exited. If the answer to step 520 is YES, a determination is made in step 530 whether the A/C is ON. If the answer in step 530 is NO, a determination is made in step 580 whether the speed ratio (turbine speed/engine speed) is substantially equal to one. Alternatively, an embodiment could be used where the speed ratio is set within a small predetermined range. When the speed ratio is substantially equal to one, it is known that the input torque to the torque converter, $T_n$, is substantially equal to zero. If the answer to step 580 is NO, the routine is exited. If the answer to step 580 is YES, the routine proceeds to step 590 wherein the instantaneous value of residual engine torque, $T_{resid}$, is calculated from the estimated value of the engine output torque, $T_e$, calculated in step 730 FIG. 6, the current adaptive term, $T_f$, and the expected torque converter torque at speed ratio of one, $T_n$:

$$T_{resid}=T_e+T_f-T_n$$

Figure 6:
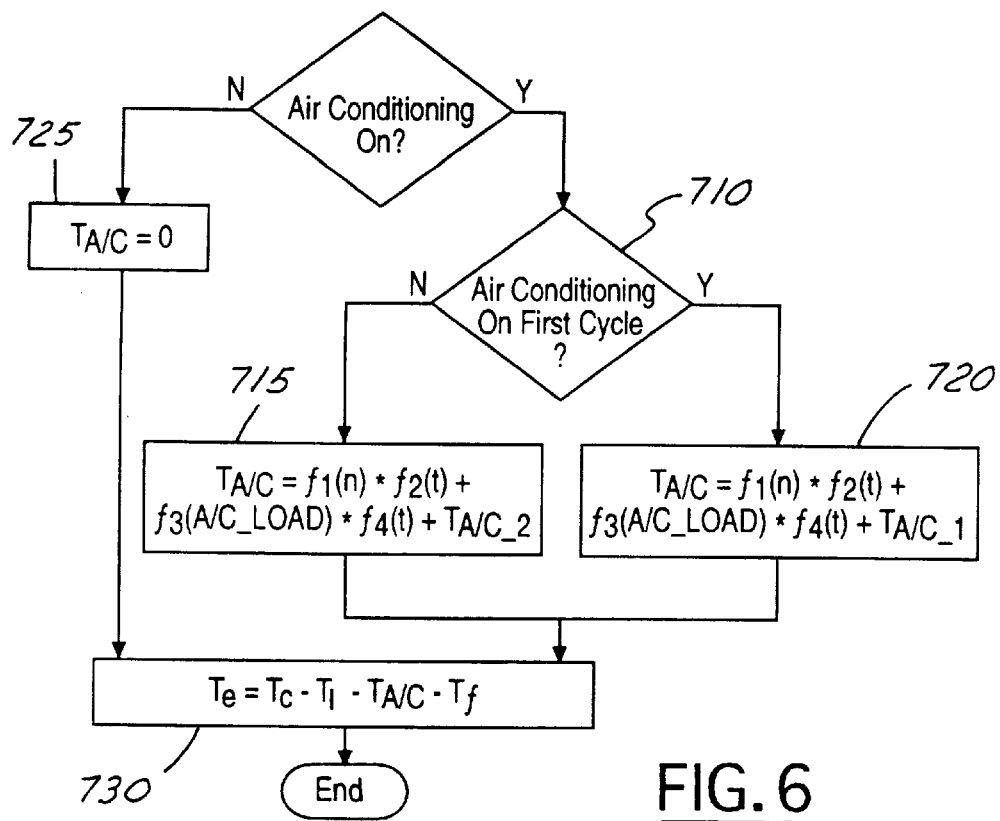

This residual torque is the difference between the uncorrected open loop torque model and the estimate of torque across the torque converter, $T_n$. The torque converter torque is substantially zero when the engine is in neutral, or when the torque converter is open, and the speed ratio across it is substantially one, or at the point when a transmission overrunning clutch becomes engaged to prevent engine breaking or disengaged to provide engine breaking. Engine breaking is prevented by an overrunning clutch that produces a one-way drive connection between a gear unit and a nonrotating powertrain member, such as transmission casing. The overrunning clutch is engaged when the wheel speed becomes greater than the engine speed by a small preselected tolerance amount. When the overrunning clutch becomes engaged, engine breaking is prevented. The point at which the overrunning clutch becomes engaged, i.e., a connection is made between a gear unit and a nonrotating member, is the point at which net torque is transitioning from positive to negative. At that point, net torque across the torque converter is essentially zero. Therefore, the equation becomes:

$$T_{resid}=T_e+T_f$$

where $T_e$ is calculated in FIG. 6, step 730. Because there is a variation in both estimates, the learned value is filtered in step 600 using filter constant methodology known to those skilled in the art:

$$T_f=FK_{tf}*T_{resid}+(1-FK_{tf})*T_f$$

The routine is then exited.

If the answer to step 530 is YES, a determination is made in step 540 whether the speed ratio is substantially equal to 1. If the answer to step 540 is NO, the routine is exited. If the answer to step 540 is YES, the routine proceeds to step 550 whereupon a determination is made whether the A/C ON command is issued for the first time. When the A/C clutch is engaged, there is a spike in the torque that eventually levels off. Also, the magnitude of the A/C torque curve is higher when the A/C ON command is issued for the first time. These two open loop A/C torque profiles are stored and used to calculate torque offset. If the answer to step 550 is YES, the routine proceeds to step 560, where instantaneous value of residual engine torque, $T_{resid}$, is calculated as the sum of engine output torque, $T_e$, and the A/C torque, $T_{a/c}$, calculated in FIG. 6, step 715, 720, or 725:

$$T_{resid}=T_e+T_{a/c}$$

Next, in step 570, filtered A/C load instantaneous error, $T_{a/c\_1}$, is calculated using the following equation:

$$T_{a/c\_1}=Fk_{a/c\_1}*T_{resid}+(1-Fk_{a/c\_1})*T_{a/c\_1}$$

If the answer to step 550 is NO (meaning the A/C has been turned on previously), the routine proceeds to step 555, where instantaneous value of residual engine torque, $T_{resid}$, is calculated as the sum of engine output torque, $T_e$, and the A/C torque, $T_{a/c}$, calculated in FIG. 6, step 715, 720, or 725:

$$T_{resid}=T_e+T_{a/c}$$

Next, in step 565, filtered A/C load instantaneous error, $T_{a/c\_2}$, is calculated using the following equation:

$$T_{a/c\_2}=Fk_{a/c\_2}*T_{resid}+(1-Fk_{a/c\_2})*T_{a/c\_2}$$

Thus, it is possible to learn correction values that improve both an engine torque estimate, as well as, an accessory load torque estimate. In addition, separate corrections can be learned depending on the number of engagements of the accessory device. As a result, a more accurate engine torque estimate and a more accurate accessory load torque estimate are achieved. These improved estimates can then be used to advantage by, for example, engine torque control as described later herein with particular reference to FIG. 8.

Referring now to FIG. 6, a routine is described for determining A/C load torque and engine output torque. First, in step 700, a determination is made whether the A/C is on. If the answer to step 700 is NO, the value of the A/C load torque, $T_{a/c}$, is set to zero. If the answer to step 700 is YES, a determination is made in step 710 whether this is the first engagement. If the answer to step 710 is YES, the A/C torque load is calculated as a sum of the open loop A/C torque model (as a function of time, A/C load and engine speed) and the instantaneous error calculated in FIG. 6, step 720.:

$$T_{a/c}=f_1(n)*f_2(t)+f_3(a/c\_load)*f_4(t)+T_{a/c\_1}$$

In a preferred embodiment, $f_4(t)$ is of the form shown in FIG. 4. Functions $f_1(n)$, $f_2(t)$, and $f_3(a/c\_load)$ are also calibratable functions, where a/c_load is determined from pressure sensor coupled either upstream or downstream of the A/C compressor.

If the answer to step 710 is NO, meaning this is a subsequent A/C engagement, the A/C load torque is calculated according to the following equation:

$$T_{a/c}=f_1(n)*f_2(t)+f_3(a/c\_load)*f_4(t)+T_{a/c\_2},$$

where $T_{a/c\_2}$ is calculated in FIG. 6, step 715.

Next, in step 730, engine output torque, $T_e$, is calculated using the following equation:

$$T_e=T_c-T_1-T_{a/c}-T_f$$

where $T_c$ is engine combustion torque as a function of operation conditions, $T_1$ is torque due to losses such as friction work, pumping work, loads form accessories other than A/C, $T_{a/c}$ is the A/C load torque, and $T_f$ is the residual engine torque. Operating conditions are engine airflow, engine speed, ignition timing, manifold pressure, throttle valve position, loading from accessories other than A/C, and/or any combination of the above. Further, any parameter known to those skilled in the art to indicate engine torque can be used with or in place of the above parameters.

Thus, an improved estimate of engine output torque is achieved that is adapted to account for changes in engine friction and/or changes in accessory loading that are not accounted for in the open loop engine and accessory loading models.

In an alternative embodiment where a manual transmission is used, the determinations of whether speed ratio across the torque converter is substantially unity can be replaced with determinations as to whether the transmission is in neutral and engine speed is substantially constant. For example, engine speed is substantially constant when engine acceleration is less than a predetermined level.

Figure 7:
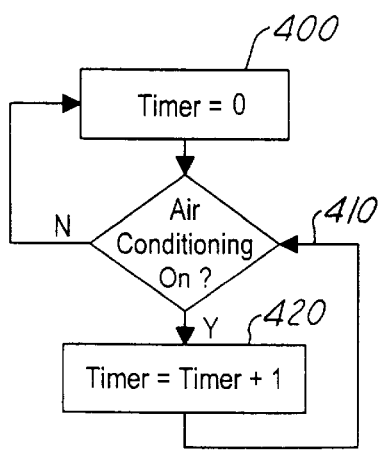
FIGS. 5, 6, 7 and 8 are block diagrams of embodiments in which the invention is used to advantage.

FIG. 7 is a routine for calculating the amount of time elapsed since the A/C compressor has been turned on. First, in step 400, timer is initialized to zero. Next, in step 410, a determination is made whether the A/C is turned on. If the answer to step 410 is YES, timer is incremented by 1 in step 420. If the answer in step 410 is NO, timer value is exited.

Figure 8:
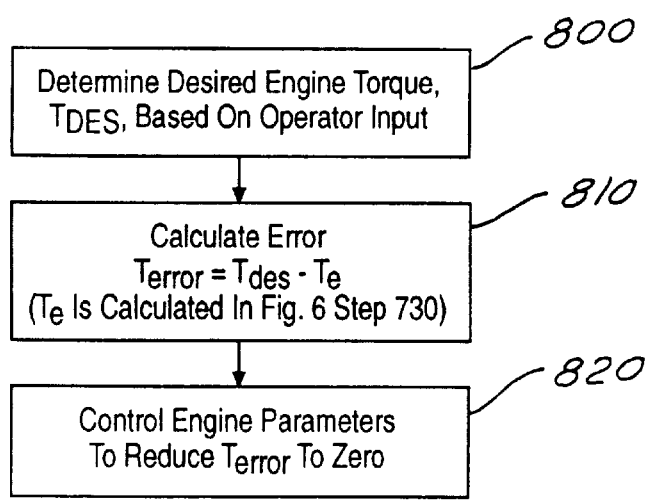

Thus, according to the present invention, it is possible to provide an estimate of A/C torque and engine torque, both of which can be used for control as described in FIG. 8.

Referring now to FIG. 8, a routine is described for controlling engine torque in response to torque error. First, in step 800, desired engine torque is determined based on operator input, such as pedal position. Next, in step 810, torque error is calculated between the desired torque and engine output torque $T_e$ as calculated in FIG. 6 step 730, followed by step 820, where engine parameters, such as mass airflow, air/fuel ratio, spark timing, throttle position, etc., are adjusted to control actual engine torque to desired engine torque. Those skilled in the art will recognize that a similar structure can also be used where a desired wheel torque is determined based on pedal position, and desired engine torque is calculated based on the desired wheel torque and gear ratio.

According to the present invention, a more accurate A/C torque level is calculated by taking into account variations in the open loop A/C torque with respect to time. This value can be provided to the engine controller to more accurately control engine torque when the A/C is engaged, disengaged, or transitioning between the two.

In addition to the A/C torque as a function of time model, various other parameters can be factored in when estimating accessory load torque, such as engine speed, intake air temperature, cabin temperature, humidity, or any other parameter known to those skilled in the art to affect accessory load torque.

Thus, according to the present invention, it is possible to correct both engine torque models and accessory load models without additional sensors or added components. In particular, by correcting the engine torque model when the accessory is disengaged, it is possible to remove accessory loading effects. Then, this corrected engine torque model can be used when the accessory is engaged to correct the accessory loading model. It is especially advantageous that learning is performed when it is precisely known that output torque is substantially zero via information from the torque converter input and output speeds. In this way, parametric variations that usually degrade torque estimated using torque converter speed ratio are avoided. Stated another way, when torque converter speed ratio is substantially unity, variations due to temperature or fluid viscosity are minimized.

This concludes the description of the invention. The reading of it by those skilled in the art would bring to mind many alterations and modifications without departing from the spirit and the scope of the invention. Accordingly, it is intended that the scope of the invention is defined by the following claims.

We claim:

1. An accessory load torque estimation method for use with an engine having an accessory, the method comprising:

learning engine torque based on an engine operating condition when engine torque is less than a predetermined value and the accessory is disengaged; and estimating a load torque of the accessory based on said operating condition and said learned engine torque when said engine torque is less than said predetermined value and the accessory is engaged.

2. The method recited in claim 1 wherein said operating condition is an engine operating condition.

3. The method recited in claim 2 wherein said engine operating condition is manifold air pressure.

4. The method recited in claim 2 wherein said engine operating condition is throttle valve position.

5. The method recited in claim 2 wherein said engine operating condition is manifold airflow.

6. The method recited in claim 1 wherein a torque converter is coupled to the engine, wherein said engine torque is less than said predetermined value when a speed ratio of torque converter input speed and torque converter output speed is within a predetermined range.

7. The method recited in claim 1 wherein said load torque of the accessory is stored as a function of accessory engagement time.

8. The method recited in claim 5 wherein said load torque of the accessory is stored as a function of a number of engagements of the accessory.

9. The method recited in claim 6 wherein said estimating further comprises estimating engine torque based on said engine operating condition when engine torque is substantially zero.

10. The method recited in claim 1 further comprising controlling the engine in response to said estimated load torque.

11. The method recited in claim 1 wherein a manual transmission is coupled to the engine, wherein said engine torque is less than said predetermined value said transmission is in neutral and engine speed is substantially constant.

12. An accessory load torque estimation method for use with an internal combustion engine having a torque converter and an accessory, the method comprising:

learning residual engine torque based on an engine operating condition when a speed ratio across the torque converter is within a predetermined range and the accessory is disengaged;

estimating a load torque of the accessory based on said operating conditions and said residual engine torque when said speed ratio is within said predetermined range and the accessory is engaged; and controlling the engine in response to said learned residual torque and said estimated load torque of the accessory.

13. The method recited in claim 12 wherein said operating condition is an engine operating condition.

14. The method recited in claim 12 wherein said engine operating condition is manifold air pressure.

15. The method recited in claim 12 wherein said engine operating condition is throttle valve position.

16. The method recited in claim 12 wherein said engine operating condition is manifold airflow.

17. The method recited in claim 13 wherein the accessory is an air conditioning compressor.

18. The method recited in claim 17 wherein said load torque of the accessory is stored as a function of a number of engagements of the accessory.

19. The method recited in claim 12 wherein said estimating further comprises estimating residual engine torque based on said engine operating condition when torque converter torque is substantially zero.

20. An article of manufacture comprising a computer storage medium having a computer program encoded therein for use with an internal combustion engine having a torque converter and an accessory, said computer storage medium comprising:

code for learning residual engine torque based on an engine operating condition when a speed ratio across said torque converter is within a predetermined range and said accessory is disengaged;

code for estimating a load torque of said accessory based on said operating conditions and said residual engine torque when said speed ratio is within said predetermined range and said accessory is engaged; and code for controlling said engine in response to said estimated load torque.

* * * * *